US008664901B2

(12) United States Patent
Perisic et al.

(10) Patent No.: US 8,664,901 B2
(45) Date of Patent: Mar. 4, 2014

(54) METHOD AND SYSTEM FOR ESTIMATING ELECTRICAL ANGULAR SPEED OF A PERMANENT MAGNET MACHINE

(75) Inventors: Milun Perisic, Cypress, CA (US); Yo Chan Son, Torrance, CA (US); Gabriel Gallegos-Lopez, Lomita, CA (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 13/397,463

(22) Filed: Feb. 15, 2012

(65) Prior Publication Data

US 2013/0207579 A1    Aug. 15, 2013

(51) Int. Cl.
*H02H 7/08*    (2006.01)

(52) U.S. Cl.
USPC . 318/400.21; 318/599; 318/610; 318/400.26; 318/811; 318/823

(58) Field of Classification Search
USPC ............ 318/400.21, 599, 800, 801, 810, 811
See application file for complete search history.

(56) References Cited

U.S. PATENT DOCUMENTS

| | | | | |
|---|---|---|---|---|
| 4,611,159 A | * | 9/1986 | Kurakake et al. | 318/803 |
| 5,410,234 A | * | 4/1995 | Shibata et al. | 318/700 |
| 7,023,168 B1 | * | 4/2006 | Patel et al. | 318/757 |
| 7,279,862 B1 | | 10/2007 | Welchko et al. | |
| RE42,200 E | | 3/2011 | Welchko et al. | |
| 8,278,850 B2 | * | 10/2012 | Gallegos-Lopez | 318/400.02 |
| 2011/0241578 A1 | * | 10/2011 | Kim et al. | 318/400.02 |
| 2013/0043816 A1 | * | 2/2013 | Welchko et al. | 318/400.21 |

* cited by examiner

*Primary Examiner* — Rita Leykin
(74) *Attorney, Agent, or Firm* — Ingrassia Fisher & Lorenz, P.C.

(57) ABSTRACT

Methods, systems and apparatus are provided for estimating electrical angular speed of a permanent magnet machine based on two-phase stationary reference frame feedback stator current samples, and a dimensionless gain (K) that is computed based on a sampling time (T) and machine parameters.

20 Claims, 5 Drawing Sheets

METHOD AND SYSTEM FOR ESTIMATING ELECTRICAL ANGULAR SPEED OF A PERMANENT MAGNET MACHINE

TECHNICAL FIELD

The present invention generally relates to electric machines. More specifically, the present invention relates to estimating electrical angular speed of a permanent magnet machine.

BACKGROUND OF THE INVENTION

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another actuator, to drive the wheels.

Hybrid and electric vehicles (HEVs) typically include an electric traction drive system that includes at least one alternating current (AC) electric motor which is driven by a power inverter module (PIM) with power from a direct current (DC) power source, such as a storage battery. Motor windings of the AC electric motor can be coupled to inverter sub-modules of the PIM. Each inverter sub-module includes a pair of switches that switch in a complementary manner to perform a rapid switching function to convert the DC power to AC power. A pulse width modulation (PWM) module receives voltage command signals and applies PWM waveforms to the voltage command signals to control pulse width modulation of the voltage command signals and generate switching vector signals that are provided to the inverter sub-modules of the inverter module. When the switching vector signals are applied, each pair of switches in each of the inverter sub-module switch in a complementary manner to perform a rapid switching function to convert the DC power to AC power. This AC power drives the AC electric motor, which in turn drives a shaft of HEV's drivetrain.

Vector Control

Many modern high performance AC motor drives use the principle of field oriented control (FOC) or "vector" control to control operation of the AC electric motor. In particular, vector control is often used in variable speed drives to control currents fed to an AC electric motor so that mechanical angular velocity of motor's rotor can be controlled and hence the torque applied to a shaft by the AC electric motor can be controlled. In short, stator phase currents are measured and converted into a corresponding complex space vector. This current vector is then transformed to a coordinate system rotating with the rotor of the AC electric motor.

Vector control requires angular position information for the rotor (i.e., the mechanical rotational angular position of rotor relative to the "stator" or motor windings). Angular position information is normally obtained via a feedback device (e.g., angular position or speed sensor). However, in some systems, sensorless control techniques can be used to provide angular position and/or angular frequency/speed information.

Sensor-Based Control

Traditional motor control systems normally include a feedback device to provide angular frequency (or "speed") and angular position information about the motor. Many vector controlled motor drive systems employ a rotor speed or position sensor to provide information regarding the rotor's angular position that is needed to control the motor. For example, the rotor's angular position can be computed based on actual measured quantities using some type of speed or position sensor for control feedback measurement. For instance, to determine the angular position of the rotor, its angular speed can be measured with a speed sensor, and the angular position can then be obtained by integrating the speed measurements. Other field-oriented or vector controlled systems may use a rotor angular position sensor or rotational transducer that provides absolute position information directly to implement motor control techniques. One such example would be a resolver and resolver-to-digital converter circuit, which directly provides position information that corresponds to the rotor's angular position.

The cost of feedback devices and associated interface circuits is significant. Removal of a feedback device for an electric motor control system (and its associated wiring and circuitry) can reduce the cost of an HEV. As such, it is desirable to eliminate this speed and/or position sensors and replace the measured quantities by computed estimates in some HEVs. In some systems, a speed or position sensor may not be implemented, and sensorless control techniques, which are described below, can be used to estimate angular position or frequency/speed.

Position/Speed Sensor Fault

In some operating scenarios, the speed or position sensor may not operate as intended (e.g., during a fault). For example, in some cases a sensor can experience a fault or fail in which case measurements provided by the sensor will be incorrect or missing completely. For instance, a loss-of-tracking (LOT) failure can result, for example, when the motor is operating in its overspeed region and the rotor's angular velocity (or "motor speed") exceeds a tracking threshold limit of the position sensor. Alternatively, LOT failure can also result, for example, when an internal position error of the position sensor exceeds a certain preset threshold. When a position sensor experiences a LOT failure, the rotor angular position measurements that are normally provided by the position sensor will usually be incorrect or missing completely. As such, unless there is a way to estimate angular position or speed, it is likely that field-oriented vector control techniques will not work as intended and it becomes necessary to shutdown the electric motor drive since it relies on this information to ensure correct operation.

Sensorless Control

As alluded to above, the objective of the sensorless control is to obtain the rotor angular position information without using speed or position sensors to measure actual speed/position quantities. Instead, electromagnetic characteristics of an AC machine can be used to eliminate the need for such sensors and their associated wiring and interface circuits. Numerous methods for estimating the rotor's angular position and speed have been developed. The methods can generally be classified as those that work better at low motor operating speeds and those that work better at high motor operating speeds. One approach that can be used to cover the entire range of motor operating speeds (i.e., rotor angular velocities) is to selectively enable/disable two different sensorless control techniques depending on the motor speed. For example, at high motor operating speeds, one sensorless control technique can be enabled, and at low motor operating speeds (or zero speed), a different sensorless control technique can be enabled.

Responses During a Fault Condition: Three-Phase Short Versus Open Response

As noted above, during normal operation the switches in each inverter module are operated in a complementary manner such that when one is switched on, the other is switched off, and vice-versa. However, during many different types of fault conditions, it is desirable to deviate from normal complementary operation and to apply either an open-circuit fault response or a short-circuit fault response at the inverter module to minimize the electric machine's torque response.

During an open-circuit response, all switches in the multi-phase inverter are controlled to be open. For example, an open-circuit fault response can be applied at the inverter module by applying open-circuit fault response control signals to the PWM module that will cause an open-circuit fault response at the inverter module (i.e., cause all switches within the inverter module to be in an open state).

By contrast, during a short-circuit response, selected switches in the multi-phase inverter are controlled to connect all phases of the multi-phase inverter to a single bus (e.g., either the plus bus or the minus bus), and all other non-selected switches in the multi-phase inverter are controlled to be open such that the non-selected switches are not connected to the single bus (e.g., either the plus bus or the minus bus). For example, a short-circuit fault response can be applied at the inverter module by applying short-circuit fault response control signals to the PWM module that will cause a short-circuit fault response at the inverter module.

Whether an open or short-circuit fault response is applied at the inverter module can depend, for example, upon the machine's angular velocity (or "speed"). One approach for determining whether an open or short-circuit fault response is to be applied is disclosed in U.S. Pat. No. 7,279,862 B1 and Reissue Pat. RE 42,200, entitled "Fault Handling of Inverter Driven PM Motor Drives" assigned to the assignee of the present invention, their contents being incorporated by reference in their entirety herein.

Although the instantaneous angular velocity of the machine's rotor can often be determined based on the output of a position sensor (or read directly from a speed sensor), as described above, in some operational scenarios, these sensors may themselves experience a fault (e.g., when the speed/position sensor fails), and therefore, the particular instantaneous angular velocity can not be easily determined (e.g., read from a angular velocity sensor or determined from the position sensor). In other sensorless systems, such sensors are not implemented at all.

Existing techniques for estimating speed of an AC electric machine (e.g., a PMM) can be inadequate since it may be necessary to wait before an estimate can be computed.

It would be desirable to provide improved methods, systems and apparatus for estimating angular velocity (and/or angular position) of a rotor of a permanent magnet machine (PMM). It would also be desirable if such improved methods, systems and apparatus allow for angular velocity (and/or position) of the rotor to be estimated quickly during certain operating scenarios. Other desirable features and characteristics of the present invention will become apparent from the subsequent detailed description and the appended claims, taken in conjunction with the accompanying drawings and the foregoing technical field and background.

SUMMARY OF THE INVENTION

Existing techniques for estimating speed of permanent magnet machine can be inadequate since it is necessary to wait for the system to settle from a transient response phase to a steady state phase before an estimate can be computed. This is particularly true in certain modes of operation such as a three-phase short operating mode.

In accordance with the disclosed embodiments, methods, systems and apparatus are provided for estimating angular velocity (and/or angular position) of a rotor of a permanent magnet machine (PMM). These improved methods, systems and apparatus allow for angular velocity (and/or position) of the rotor to be estimated without having to wait for the system to settle to a steady state value, for example, during a transient phase of a three-phase short operating mode when a short-circuit fault response is applied at an inverter module.

In accordance with some of the disclosed embodiments, a drive system for a permanent magnet machine is provided that includes a controller. The controller includes an electrical angular speed estimator module that is configured to compute an estimated electrical angular speed ($\omega_{est}(k)$) of the permanent magnet machine based on three or more stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$), and a dimensionless gain (K) that is computed based on a sampling time (T) and machine parameters (e.g., a stator inductance ($L_s$) and a stator resistance ($R_s$)).

In one embodiment, in which the permanent magnet machine is a surface mount permanent magnet machine, the electrical angular speed estimator module is configured to compute the estimated electrical angular speed ($\omega_{est}(k)$) based on an equation:

$$\omega_{est} = \frac{1}{T}\arctan\frac{di_{\alpha 1}di_{\beta 2} - di_{\alpha 2}di_{\beta 1}}{di_{\alpha 1}di_{\alpha 2} + di_{\beta 1}di_{\beta 2}},$$

where T is sampling time, $di_{\alpha 1}$ is a first α-axis current difference at a first sample point and a second sample point, $di_{\alpha 2}$ is a second α-axis current difference at the second sample point and a third sample point, $di_{\beta 1}$ is a first β-axis current difference at the first sample point and the second sample point, $di_{\beta 2}$ is a second β-axis current difference at the second sample point and the third sample point.

In one particular implementation, the first α-axis current difference ($di_{\alpha 1}$), the second α-axis current difference ($di_{\alpha 2}$), the first β-axis current difference ($di_{\beta 1}$), and the second β-axis current difference ($di_{\beta 2}$) can be computed based on equations:

$di_{\alpha 1} = i_\alpha(k+1) - Ki_\alpha(k), di_{\alpha 2} = i_\alpha(k+2) - Ki_\alpha(k+1), di_{\beta 1} = i_\beta(k+1) - Ki_\beta(k), di_{\beta 2} = i_\beta(k+2) - Ki_\beta(k+1)$, respectively, where k is an index that corresponds to a first sample point, K is the dimensionless gain, $i_\alpha(k)$ is an α-axis component of the stationary reference frame feedback stator current sample at the first sample point, $i_\alpha(k+1)$ is an α-axis component of the stationary reference frame feedback stator current sample at a second sample point, $i_\alpha(k+2)$ is an α-axis component of the stationary reference frame feedback stator current sample at a third sample point, $i_\beta(k)$ is a β-axis component of the stationary reference frame feedback stator current sample at the first sample point, $i_\beta(k+1)$ is a β-axis component of the stationary reference frame feedback stator current sample at the second sample point, and $i_\beta(k+2)$ is a β-axis component of the stationary reference frame feedback stator current sample at the third sample point. The dimensionless gain (K) can be computed based on an equation:

$$K = e^{-\frac{R_s T}{L_s}},$$

where $L_s$ a stator inductance ($L_d$), and $R_s$ is a stator resistance ($R_s$).

In another embodiment, in which the permanent magnet machine is an interior permanent magnet machine, the electrical angular speed estimator module can compute the estimated electrical angular speed ($\omega_{est}(k)$) of the interior permanent magnet machine based on an equation:

$$\omega_{est} = \frac{1}{T}\arctan\frac{di_{\alpha1/\beta}di_{\beta2/\alpha1} - di_{\alpha2/\beta1}di_{\beta1/\alpha}}{di_{\alpha1/\beta}di_{\alpha2/\beta1} + di_{\beta1/\alpha}di_{\beta2/\alpha1}},$$

where T is sampling time, $di_{\alpha1/\beta}$ is a first α-axis/β-axis current difference at a first sample point and a second sample point, $di_{\beta1/\alpha}$ is a first β-axis/α-axis current difference at the first sample point and the second sample point, $di_{\alpha2/\beta1}$ is a second α-axis/β-axis current difference at the second sample point and a third sample point, and $di_{\beta2/\alpha1}$ is a second β-axis/α-axis current difference at the second sample point and the third sample point. In this embodiment, the dimensionless gain comprises a dimensionless gain matrix K(k).

In one implementation, the electrical angular speed estimator module can compute the dimensionless gain matrix K(k) based on an equation:

$$K(k) = e^{-\alpha T}\begin{bmatrix} 1+(\gamma-1)(\omega_{est}(k)T)^2 & (\gamma-1)\omega_{est}(k)T \\ -(\gamma-1)\omega_{est}(k)T & 1+(\gamma-1)(\omega_{est}(k)T)^2 \end{bmatrix},$$

where k is an index that corresponds to the first sample point, α is machine parameter that is computed based on a d-axis stator inductance ($L_d$), a q-axis stator inductance ($L_q$), and a stator resistance ($R_s$), and wherein γ is dimensionless coefficient that is computed based on a d-axis stator inductance ($L_d$) and a q-axis stator inductance ($L_q$). The first α-axis/β-axis current difference ($di_{\alpha1/\beta}$), the second α-axis/β-axis current difference ($di_{\alpha2/\beta1}$), the first β-axis/α-axis current difference ($di_{\beta1/\alpha}$), and the second β-axis/α-axis current difference ($di_{\beta2/\alpha1}$) can be computed based on equations:

$di_{\alpha1/\beta}=i_\alpha(k+1)-k_1i_\alpha(k)-k_2i_\beta(k) di_{\alpha2/\beta1}=i_\alpha(k+2)-k_1i_\alpha(k+1)-k_2i_\beta(k+1), di_{\beta1/\alpha}=i_\beta(k+1)-k_1i_\beta(k)+k_2i_\alpha(k), di_{\beta2/\alpha1}=i_\beta(k+2)-k_1i_\beta(k+1)+k_2i_\alpha(k+1)$, respectively, where $k_1$ is a diagonal element of the dimensionless gain matrix K(k) and $k_2$ is a sub-diagonal element of the dimensionless gain matrix K(k), $i_\alpha(k)$ is an α-axis component of the stationary reference frame feedback stator current sample at the first sample point, $i_\alpha(k+1)$ is an α-axis component of the stationary reference frame feedback stator current sample at a second sample point, $i_\alpha(k+2)$ is an α-axis component of the stationary reference frame feedback stator current sample at a third sample point, $i_\beta(k)$ is a β-axis component of the stationary reference frame feedback stator current sample at the first sample point, $i_\beta(k+1)$ is a β-axis component of the stationary reference frame feedback stator current sample at the second sample point, and $i_\beta(k+2)$ is a β-axis component of the stationary reference frame feedback stator current sample at the third sample point.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to estimating electrical angular speed of a multi-phase alternating current machine without using a sensor (e.g., when the sensor is unavailable for any reason such as when an angular speed or angular position sensor is not available or is experiencing a fault). It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task, which may be defined herein within the context of a method. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for estimating electrical angular speed of a multi-phase alternating current machine without using a sensor, as described herein. As such, these functions may be interpreted as steps of a method for estimating electrical angular speed of a multi-phase alternating current machine without using a sensor. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Types of AC Machines and Corresponding Machine Parameters

Prior to describing the disclosed embodiments in detail, some features and characteristics of examples of different types of alternating current machines that the disclosed embodiments can be applied to will now be described below.

As used herein, the term "alternating current (AC) machine" generally refers to "a device or apparatus that converts electrical energy to mechanical energy or vice versa using alternating current." Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current.

An AC machine typically includes a stationary stator having coils supplied with alternating current to produce a rotating magnetic field, and a rotor attached to an output shaft. The rotor generates the magnetic flux, and it is driven by the torque that is determined by the relation between the stator and rotor flux. The stator that has a stator resistance ($R_s$) and a stator inductance ($L_s$). Some of the parameters that can be measured or determined with respect to any type of AC machine include stator terminal voltages ($V_s$), which can be decomposed into d-axis stator terminal voltage ($V_d$), q-axis stator terminal voltage ($V_q$), stator currents ($I_s$), which can be decomposed into d-axis stator current ($I_d$) and q-axis stator current ($I_q$), stator flux ($\Psi_s$), which can be decomposed into d-axis stator flux ($\Psi_d$) and q-axis stator flux ($\Psi_q$), and rotor flux ($\psi_f$) as observed at the stator winding.

Some of the parameters that can be used to characterize performance in any type of electric machine include rotor flux angular position ($\theta_e$) seen at the stator terminal, rotor angular position ($\theta_r$) seen at the stator terminal, and the rotor speed ($\omega_r$) in radians/second. The electrical angular speed ($\omega_e$) in radians/second is equal to the product of rotor mechanical speed ($\omega_r$) in radians/second and the number of pole-pairs (PP) of the electric machine (i.e., $\omega_e = \omega_r \times PP$).

AC machines can generally be classified as being either synchronous AC machines or asynchronous AC machines. In a synchronous machine, the rotating magnetic field of the stator imposes a torque on the magnetic field of the rotor causing it to rotate steadily. In a permanent magnet machine, the magnetic field on the rotor is generated by a permanent magnet. It is called synchronous because at steady state, the angular speed of the rotor matches the angular speed of the rotating magnetic field in the stator. A synchronous machine can rotate exactly at the supply speed or a sub-multiple of the supply speed since it does not rely on induction.

Synchronous AC machines can include permanent magnet machines and synchronous reluctance machines. PMAC machines include surface mount permanent magnet machines (SMPMMs) and interior permanent magnet machines (IPMMs). Synchronous machines have a stator inductance ($L_s$) that can be decomposed into a d-axis stator inductance ($L_d$) and q-axis stator inductance ($L_q$). The rotor flux angular position ($\theta_e$) seen at the stator terminal is equal to the rotor angular position ($\theta_r$) seen at the stator terminal. In a synchronous machine, synchronous angular speed ($\omega_e$) in radians/second is equal to rotor speed ($\omega_r$) in radians/second. Electrical (angular) speed is equal to the rotor mechanical (angular) speed multiplied by the number of stator pole pairs of the synchronous machine. Synchronous speed is the speed of the rotating field, and is directly proportional to the stator voltage or current frequency and inversely proportional to number of poles. In addition, it is noted that in the case of permanent magnet AC machine, the rotor flux ($\psi_f$) as observed at the stator winding is caused by a permanent magnet.

Having provided some background information regarding synchronous PMMs, methods, systems and apparatus for estimating electrical angular speed of a multi-phase alternating current PMM without using angular speed or position sensor will now be described with reference to FIGS. 1-4. The disclosed methods, systems and apparatus for estimating electrical angular speed of a multi-phase alternating current PMM can be applied during a three-phase short operating mode. In accordance with some of the disclosed embodiments, methods, systems and apparatus electrical angular speed (and/or electrical angular position) of a rotor of an AC PMM can be estimated during a transient phase of a three-phase short operating mode (e.g., when a short-circuit fault response is applied at an inverter module) without having to wait for the system to settle to a steady state value before an estimate can be computed.

Figure 1:
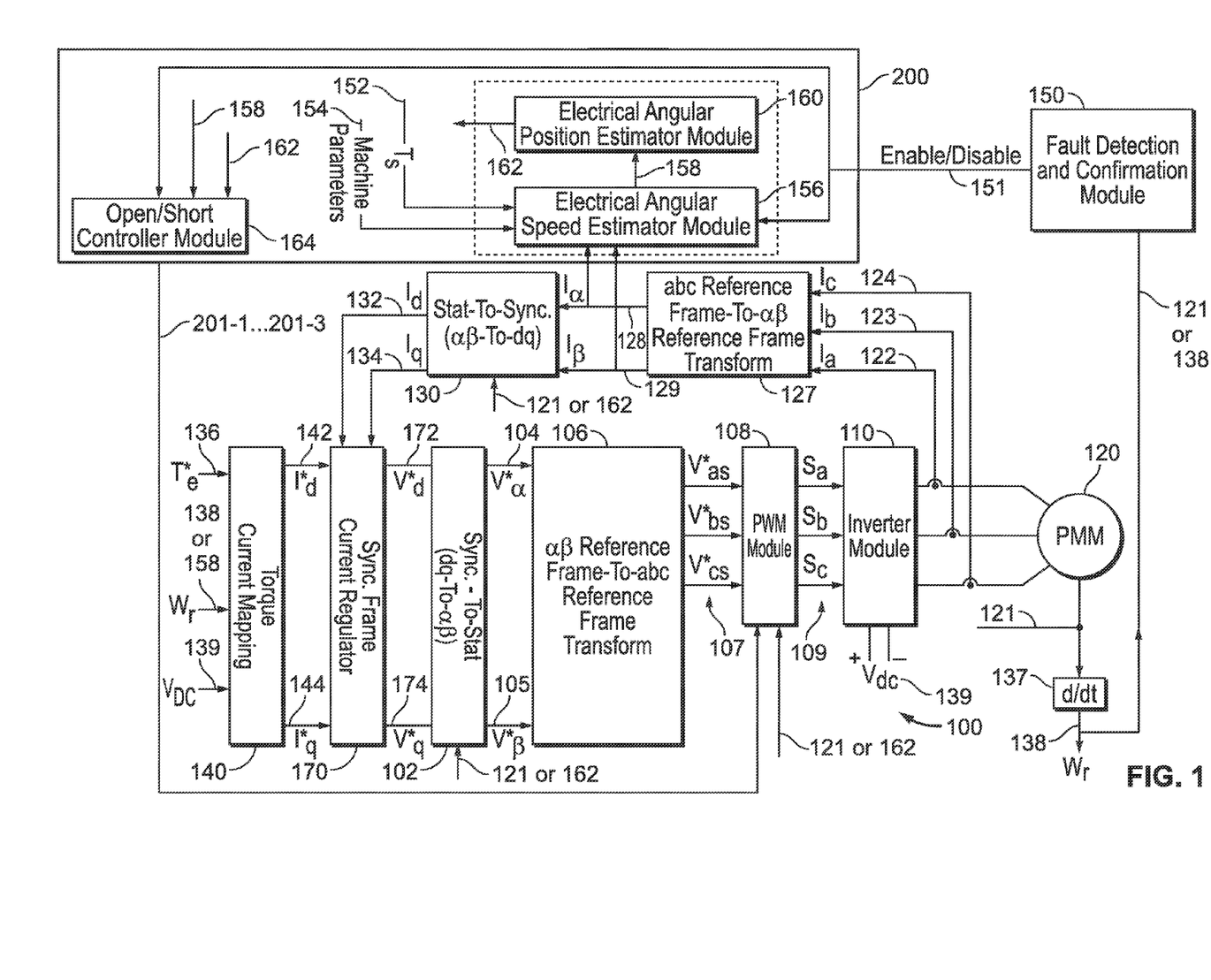
FIG. 1 is a block diagram of one example of a electric motor drive system in accordance with one of the disclosed embodiments.

FIG. 1 is a block diagram of one example of a PMM drive system 100 in accordance with the disclosed embodiments. The PMM drive system 100 controls a three-phase AC PMM 120 via a three-phase pulse width modulated (PWM) inverter module 110 coupled to the three-phase AC PMM 120 so that the three-phase AC PMM 120 can efficiently use a DC input voltage (Vdc) 139 provided to the three-phase PWM inverter module 110 by adjusting current commands that control the three-phase AC PMM 120. In one particular implementation, the PMM drive system 100 can be used to control torque in an HEV.

In the following description of one particular non-limiting implementation; however, it should be appreciated that the illustrated embodiment is only one non-limiting example and that the disclosed embodiments can be applied to any type of multi-phase AC PMM that includes fewer or more phases. In the implementation that is illustrated, the three-phase AC PMM 120 is coupled to the three-phase inverter module 110 via three inverter poles and generates mechanical power (Torque X Speed) based on three-phase current signals received from the inverter module 110. In some implementations, the angular position of a rotor (θr) 121 or "shaft position" is measured using a position sensor 182 (not illustrated in FIG. 1, but shown in FIG. 2). The derivative of the angular position of a rotor (θr) 121 with respect to time can be used to generate angular speed (ωr) 138 of the three-phase AC PMM 120. In accordance with the disclosed embodiments, when the angular position of a rotor (θr) 121 and angular speed (ωr) 138 are not available (e.g., during a sensor fault), an estimated electrical angular speed ($\omega_{est}$) 158 can be computed and used to compute an estimated electrical angular position ($\theta_{est}$) 162.

A more detailed description of one possible implementation of a three-phase voltage source inverter 110 will be provided below with reference to FIG. 2.

The PMM drive system 100 includes a torque-to-current mapping module 140, a synchronous frame current regulator module 170, a synchronous-to-stationary transformation module 102, an αβ reference frame-to-abc reference frame transformation module 106, a Pulse Width Modulation (PWM) module 108, a three-phase PWM inverter 110, an abc reference frame-to-αβ reference frame transformation module 127, a stationary-to-synchronous transformation module 130, a fault detection and confirmation module 150, and a controller 200 that includes an electrical angular speed estimator module 156, an electrical angular position estimator module 160, and an open/short controller module 164.

The torque-to-current mapping module 140 receives a torque command (Te*) 136, either an angular velocity (ωr) 138 of the shaft that is generated based on the derivative of the rotor/shaft position output (θr) 121 or an estimated electrical angular speed ($\omega_{est}$) 158, and the DC input voltage ($V_{DC}$) 139 as inputs, along with possibly a variety of other system parameters depending upon implementation. The torque-to-current mapping module 140 uses these inputs to generate a d-axis current command (Id*) 142 and a q-axis current command (Iq*) 144 that will cause the machine 120 to generate the commanded torque (Te*) at either the angular velocity (ωr) 138 or an estimated electrical angular speed ($\omega_{est}$) 158 that is generated via sensorless estimation. In particular, the torque-to-current mapping module 140 uses the inputs to map the torque command signal (Te*) 136 to a d-axis current command signal (Id*) 142 and a q-axis current command signal (Iq*) 144. The synchronous reference frame d-axis and q-axis current command signals (Id*, Iq*) 142, 144 are DC commands that have a constant value as a function of time.

The abc-to-αβ transformation module 127 receives the measured three-phase stationary reference frame feedback stator currents (Ia . . . Ic) 122-124 that are fedback from machine 120. The abc-to-αβ transformation module 127 uses these three-phase stationary reference frame feedback stator currents 122-124 to perform an abc reference frame-to-αβ reference frame transformation to transform the three-phase stationary reference frame feedback stator currents 122-124 into two-phase stationary reference frame feedback stator currents (Iα, Iβ) 128, 129. The abc-to-αβ transformation can be performed using any known transformation technique including using the matrices defined in equation (1) below.

$$\begin{bmatrix} i_\alpha \\ i_\beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_a \\ i_b \\ i_c \end{bmatrix} \quad (1)$$

In equation (1) the column vector that represents the three-phase stationary reference frame feedback stator currents 122-124 is multiplied by a transformation matrix and scaling factor to generate a column vector that represents the two-phase stationary reference frame feedback stator currents (Iα, Iβ) 128, 129.

The stationary-to-synchronous transformation module 130 receives the two-phase stationary reference frame feedback stator currents (Iα, Iβ) 128, 129 and either the measured rotor angular position (θr) 121 or an estimated electrical angular position ($\theta_{est}$) 162, and generates (e.g., processes or converts) these two-phase stationary reference frame feedback stator currents (Iα, Iβ) 128, 129 to generate a synchronous reference frame d-axis current signal (Id) 132 and a synchronous reference frame q-axis current signal (Iq) 134. The process of stationary-to-synchronous conversion is well-known in the art and for sake of brevity will not be described in detail.

The synchronous frame current regulator module 170 receives the synchronous reference frame d-axis current signal (Id) 132, the synchronous reference frame q-axis current signal (Iq) 134, the d-axis current command (Id*) 142 and the q-axis current command (Iq*) 144, and uses these signals to generate a synchronous reference frame d-axis voltage command signal (Vd*) 172 and a synchronous reference frame q-axis voltage command signal (Vq*) 174. The synchronous reference frame voltage command signals (Vd*, Vq*) 172, 174 are DC commands that have a constant value as a function of time for steady state operation. Because the current commands are DC signals in the synchronous reference frame they are easier to regulate in comparison to AC stationary reference frame current commands. The process of current to voltage conversion can be implemented as a Proportional-Integral (PI) controller, which is known in the art and for sake of brevity will not be described in detail.

The synchronous-to-stationary transformation module 102 receives the synchronous reference frame d-axis voltage command signal (Vd*) 172 and the synchronous reference frame q-axis voltage command signal (Vq*) 174 along with either the rotor position output (θr) 121 or the estimated electrical angular position ($\theta_{est}$) 162. In response to these inputs, the synchronous-to-stationary transformation module 102 performs a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave (that are spaced 90 degrees apart) as a function of time. The process of synchronous-to-stationary conversion is well-known in the art and for sake of brevity will not be described in detail.

The αβ-to-abc transformation module 106 receives the stationary reference frame voltage command signals (Vα*, Vβ*) 104, 105, and based on these signals, generates stationary reference frame voltage command signals (Vas* . . . Vcs*) 107 (also referred to as "phase voltage signals" or "phase voltage command signals") that are sent to the PWM module 108. The αβ-to-abc transformation can be performed using any known transformation technique including using the matrices defined in equation (2) below.

$$\begin{bmatrix} v_a \\ v_b \\ v_c \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} v_\alpha \\ v_\beta \end{bmatrix} \quad (2)$$

In equation (2) the column vector that represents the stationary reference frame voltage command signals (Vα*, Vβ*) 104, 105 is multiplied by a transformation matrix and scaling factor to generate a column vector that represents the stationary reference frame voltage command signals (Vas* . . . Vcs*) 107 (or "phase voltage command signals").

The three-phase PWM inverter module 110 is coupled to the PWM module 108. The PWM module 108 is used for the control of pulse width modulation (PWM) of the phase voltage command signals (Vas* . . . Vcs*) 107. The switching vector signals (Sa . . . Sc) 109 are generated based on duty cycle waveforms that are not illustrated in FIG. 1, but are instead internally generated at the PWM module 108 to have a particular duty cycle during each PWM period. The PWM module 108 modifies the phase voltage command signals (Vas* . . . Vcs*) 107 based on the duty cycle waveforms (not illustrated in FIG. 1) to generate switching vector signals (Sa . . . Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the three-phase AC powered machine 120 at varying angular velocities based on the DC input 139.

The switching vector signals (Sa . . . Sc) 109 control the switching states of switches in PWM inverter 110 to generate three-phase voltage commands at each phase A, B, C. The switching vector signals (Sa . . . Sc) 109 are PWM waveforms that have a particular duty cycle during each PWM period that is determined by the duty cycle waveforms that are internally generated at the PWM module 108.

As described above, the switching states of switches in inverter module 110 are controlled using switching vector signals (Sa . . . Sc) 109 to generate three-phase stationary reference frame feedback stator currents 122-124. During normal operation, the three-phase inverter module 110 is controlled so that at no time are both switches in the same inverter sub-module 115-117 or "leg" are turned on to prevent the DC supply from being shorted. As such, the switches in the same inverter sub-module 115-117 are operated in a complementary manner (during normal operation) such that when one is off the other is on and vice versa. To explain further, in a given phase (A . . . C) at any particular time, one of the switches is off and the other one of the switches is on (i.e., the two switches in a particular inverter sub-module must have opposite on/off states). As such, for a particular inverter sub-module, the on/off status of the two switches in that inverter sub-module can be represented as a binary 1 or binary 0. For example, when the upper switch in a given phase is on (and the lower switch is off) the value of a bit will be one (1), and when the lower switch in a given phase is on (and the upper switch is off) the value of a bit will be zero (0).

As will be explained below, when a sensor fault occurs, the inverter modules should be operated differently, and to do so, either an open-circuit fault response or a short-circuit fault response can be applied.

The three-phase PWM inverter module 110 receives the DC input voltage (Vdc) and switching vector signals (Sa . . . Sc) 109, and uses them to generate three-phase alternating current (AC) voltage signal waveforms at inverter poles that drive the three-phase AC PMM 120 at varying angular velocities ($\omega_r$).

The three-phase machine 120 receives the three-phase voltage signals generated by the PWM inverter 110 and generates a machine output at the commanded torque Te* 136.

Although not illustrated in FIG. 1, the system 100 may also include a gear coupled to and driven by a shaft of the three-phase AC PMM 120. The measured feedback stator currents (Ia-Ic) 122-124 are sensed, sampled and provided to the abc-to-αβ transformation module 127 as described above.

Figure 2:
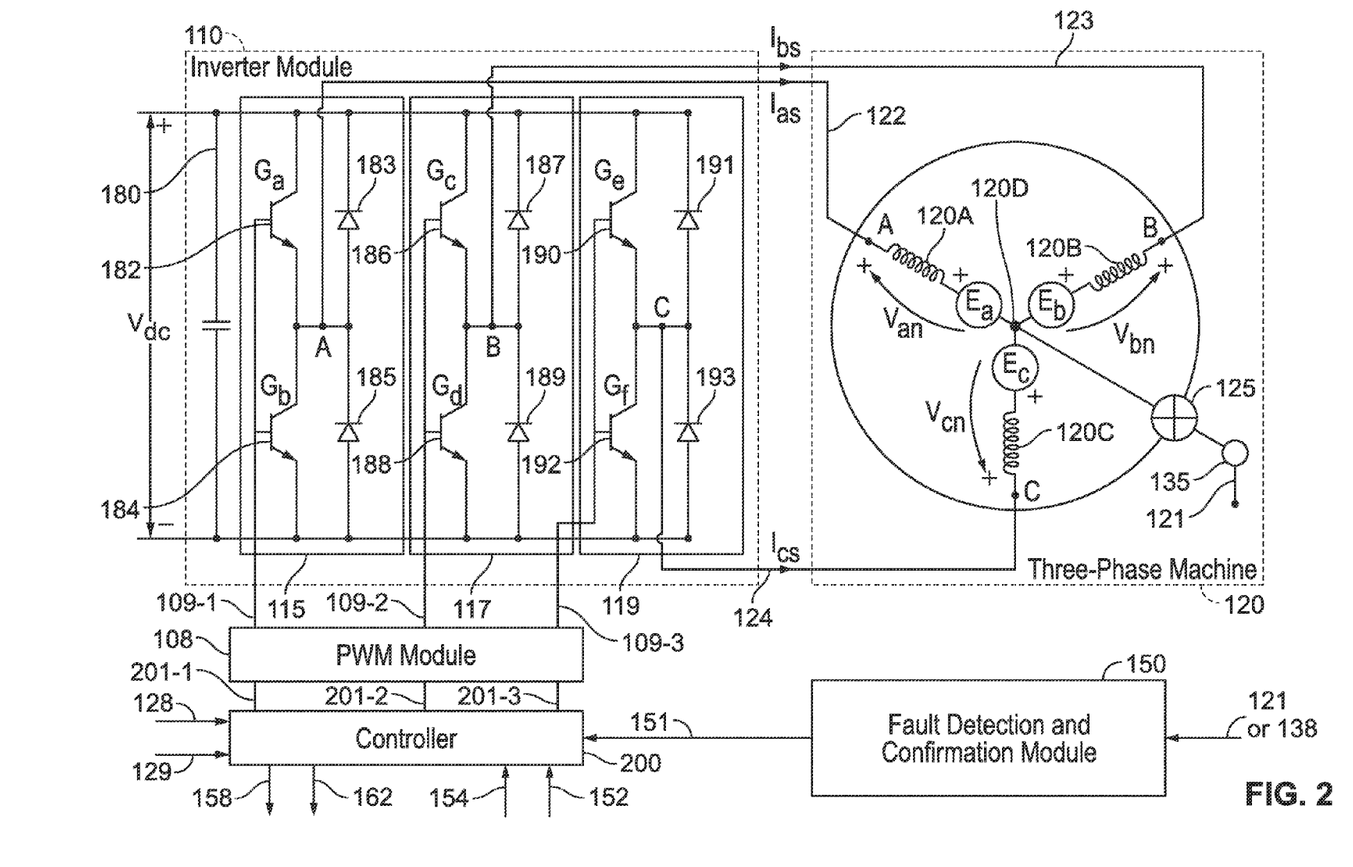
FIG. 2 is a schematic view that illustrates one exemplary implementation of a portion of an electric motor drive system of FIG. 1 in greater detail.

FIG. 2 is a block diagram of a portion of a machine drive system including a three-phase voltage source inverter 110 connected to a three-phase AC PMM 120. It should be noted that the three-phase voltage source inverter 110 and the three-phase machine 120 in FIG. 1 are not limited to this implementation; rather, FIG. 2 is merely one example of how the three-phase voltage source inverter 110 and the three-phase machine 120 in FIG. 1 could be implemented in one particular embodiment.

As illustrated in FIG. 2, the three-phase AC PMM 120 has three stator or machine windings 120A, 120B, 120C, connected to machine terminals A, B, C, and the three-phase PWM inverter module 110 includes a capacitor 180 and three inverter sub-modules 115, 117, and 119. In this particular embodiment, in phase A the inverter sub-module 115 is coupled to machine winding 120A, in phase B the inverter sub-module 117 is coupled to machine winding 120B, and in phase C the inverter sub-module 119 is coupled to machine winding 120C. The machine windings A, B, C (120A, 120B, 120C) are coupled together at a neutral point (N) 120D. The current into machine winding A 120A flows out machine windings B, C 120B-120C, the current into machine winding B 120B flows out machine windings A and C, 120A, 120C, and the current into machine winding C 120C flows out machine windings A and B, 120A, 120B.

The resultant phase or stator currents (Ia-Ic) 122, 123, 124, flow through respective stator windings 120A-C. The phase to neutral voltages across each of the stator windings 120A-120C are respectively designated as $V_{an}$, $V_{bn}$, $V_{cn}$, with the back electromotive force (EMF) voltages generated in each of the stator windings 120A-120C respectively shown as the voltages $E_a$, $E_b$, $E_c$, each respectively shown connected in series with stator windings 120A-120C. As is well known, these back EMF voltages $E_a$, $E_b$, $E_c$, are the voltages induced in the respective stator windings 120A-120C by the rotation of the permanent magnet rotor. Although not shown, the machine 120 can be coupled to a drive shaft.

The inverter 110 includes a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. As such, inverter 110 has six solid state controllable switching devices 182, 184, 186, 188, 190, 192, and six diodes 183, 185, 187, 189, 191, 193, to appropriately switch compound voltage ($V_{DC}$) 139 and provide three-phase energization of the stator windings 120A, 120B, 120C of the three-phase AC PMM 120. During normal operating conditions, switching of solid state switching devices 182, 184, 186, 188, 190, 192 within the inverter sub-modules 115, 117, 119 is controlled by providing appropriate control signals 109 to the individual inverter sub-modules 115, 117, 119, thereby controlling the outputs of the inverter sub-modules 115, 117, 119 that are provided to machine windings 120A-120C, respectively. The resultant stator currents (Ia . . . Ic) 122-124 that are generated by the inverter sub-modules 115, 117, 119 of the three-phase inverter module 110 are provided to machine windings 120A, 120B, 120C. The voltages as $V_{an}$, $V_{bn}$, $V_{cn}$, and the voltage at node N fluctuate over time depending on the open/close states of switches 182, 184, 186, 188, 190, 192 in the inverter sub-modules 115, 117, 119 of the inverter module 110. The back electromotive force (EMF) voltages $E_a$, $E_b$, $E_c$ are not influenced by the inverter switching, but only motor speed.

Three-Phase Open and Short States

When a fault occurs (e.g., a sensor fault or failure) occurs, the AC PMM 120 should be shut down in a controlled manner. To do so, one of two fault responses can be applied: an open-circuit fault response or a short-circuit fault response. Which response should be applied depends on the angular velocity of the AC PMM 120 and whether it exceeds a transition angular velocity (e.g., about 7,000 rpm).

When the AC electric machine 120 rotates at angular velocities below the transition angular velocity, the open/ short controller module 164 of the controller 200 should cause the PWM module 108 to make the inverter module 110 apply an open-circuit fault response and force all switches of the inverter module to be off (i.e., open circuit). This causes the AC electric machine 120 to be put into an uncontrolled generator mode (UCG mode) so that the AC electric machine 120 generates no current and produces no breaking torque.

On the other hand, if the AC electric machine 120 is rotating at angular velocities above the transition angular velocity, the UCG mode generates increasingly more current with increasing angular velocity, which produces increasingly more breaking torque. Therefore, the open/short controller module 164 of the controller 200 avoids switching to the open-circuit fault response when the AC electric machine 120 rotates at angular velocities above the transition angular velocity.

At angular velocities below the transition angular velocity, the short-circuit response generates increasingly more current from the AC electric machine 120 (as angular velocity is increased from zero rpm) and initially produces increasingly more breaking torque at low rpm, but diminishing torque as the rpm approaches the transition angular velocity.

In accordance with the disclosed embodiments, when an angular position sensor and/or angular velocity sensor (or "speed sensor") experiences a fault, the fault is detected and an indication of the fault is provided to the controller 200. The controller 200 can receive the two-phase stationary reference frame feedback stator currents (Iα, Iβ) 128, 129. Based on these two-phase stationary reference frame feedback stator currents (Iα, Iβ) 128, 129, the electrical angular speed estimator module 156 of the controller 200 can estimate an mechanical angular speed of the rotor, and then generate control signals 202-1 . . . 201-3 that are provided to the PWM module 108 to cause either an open-circuit fault response or short-circuit fault response to be applied at the inverter module 110. The control signals 201 will either (1) cause all switches within the inverter module 110 to open, or (2) cause selected ones of the switches (e.g., 182, 186, 190, or 184, 188, 192) within the inverter module 110 to close so that all phases of the inverter module 110 are connected to a single bus (e.g., either the plus bus or the minus bus), while all other non-selected switches (184, 188, 192, or 182, 186, 190) in the inverter module 110 are left open such that the non-selected switches are not connected to the single bus (e.g., either the plus bus or the minus bus).

To explain further, when an open-circuit fault response is applied at the inverter module 110, the open-circuit fault response control signals 201 are designed to cause the output signals 109 from PWM module 108 to open all switches 182, 184, 186, 188, 190, 192 within the inverter module 110, and thus effectively place the switches 182, 184, 186, 188, 190, 192 in the inverter module 110 in an open state (also known as a three-phase open-circuit fault response). By opening all of the switches 182, 184, 186, 188, 190, 192 in the inverter module 110, this forces all switches of the inverter module to be off (i.e., open circuit), which causes the AC electric machine 120 to be put into an uncontrolled generator mode (UCG mode) so that the AC electric machine 120 generates no current.

By contrast, when short-circuit fault response is applied at the inverter module 110, the close response control signals 201 are designed to cause the output signals 109 from PWM module 108 to close selected ones of the switches (e.g., 182, 186, 190, or 184, 188, 192) within the inverter module 110 to connect all phases of the inverter module 110 to a single bus (e.g., either the plus bus or the minus bus), and to cause all other non-selected switches (184, 188, 192, or 182, 186, 190) in the inverter module 110 to be open such that the non-selected switches are not connected to the single bus (e.g., either the plus bus or the minus bus). Collectively, this is known as a short-circuit fault response, where half of the switches of the inverter module 110 are in a shorted state. Selected ones of the switches (e.g., 182, 186, 190, or 184, 188, 192) within the inverter module 110 connect all phases of the inverter module 110 to a single bus (e.g., either the plus bus or the minus bus), and the non-selected switches (184, 188, 192, or 182, 186, 190) are open (and not connected to the single bus). Applying this short-circuit fault response generates increasingly more current from the AC electric machine 120 (as electrical angular speed increases from zero rpm) and initially produces increasingly more breaking torque at low rpm, but diminishing torque as the rpm approaches the transition angular velocity.

The fault detection and confirmation module 150 receives either the mechanical angular velocity ($\omega r$) 138 or the estimated electrical angular speed ($\omega_{est}$) 158, and based on that input, generates an enable/disable signal 151 that is provided to the electrical angular speed estimator module 156, the electrical angular position estimator module 160, and the open/short controller module 164 of the controller 200. The electrical angular speed estimator module 156, the electrical angular position estimator module 160, and the open/short controller module 164 are controlled by an enable/disable signal 151 which is used to either enable or disable those modules 156, 160, 164 of the controller 200. These modules 156, 160, 164 of the controller 200 are enabled only when it receives an enable signal 151 is received from the fault detection and confirmation module 150. Otherwise, these modules 156, 160, 164 of the controller 200 receive a disable signal 151 and are not operational. In other words, these modules 156, 160, 164 of the controller 200 are enabled or activated only when fault detection and confirmation module 150 determines that a sensor fault has been detected and confirmed. Numerous different implementations of the fault detection and confirmation module 150 are known in the art, and any known fault detection and confirmation module 150 can be used depending on the implementation. In alternative embodiments, the electrical angular speed estimator module 156 and the electrical angular position estimator module 160 can be run on a continuous basis so that an appropriate alternative speed estimate always exists and is immediately ready to be used upon the detection of a fault by module 150.

Figure 3:
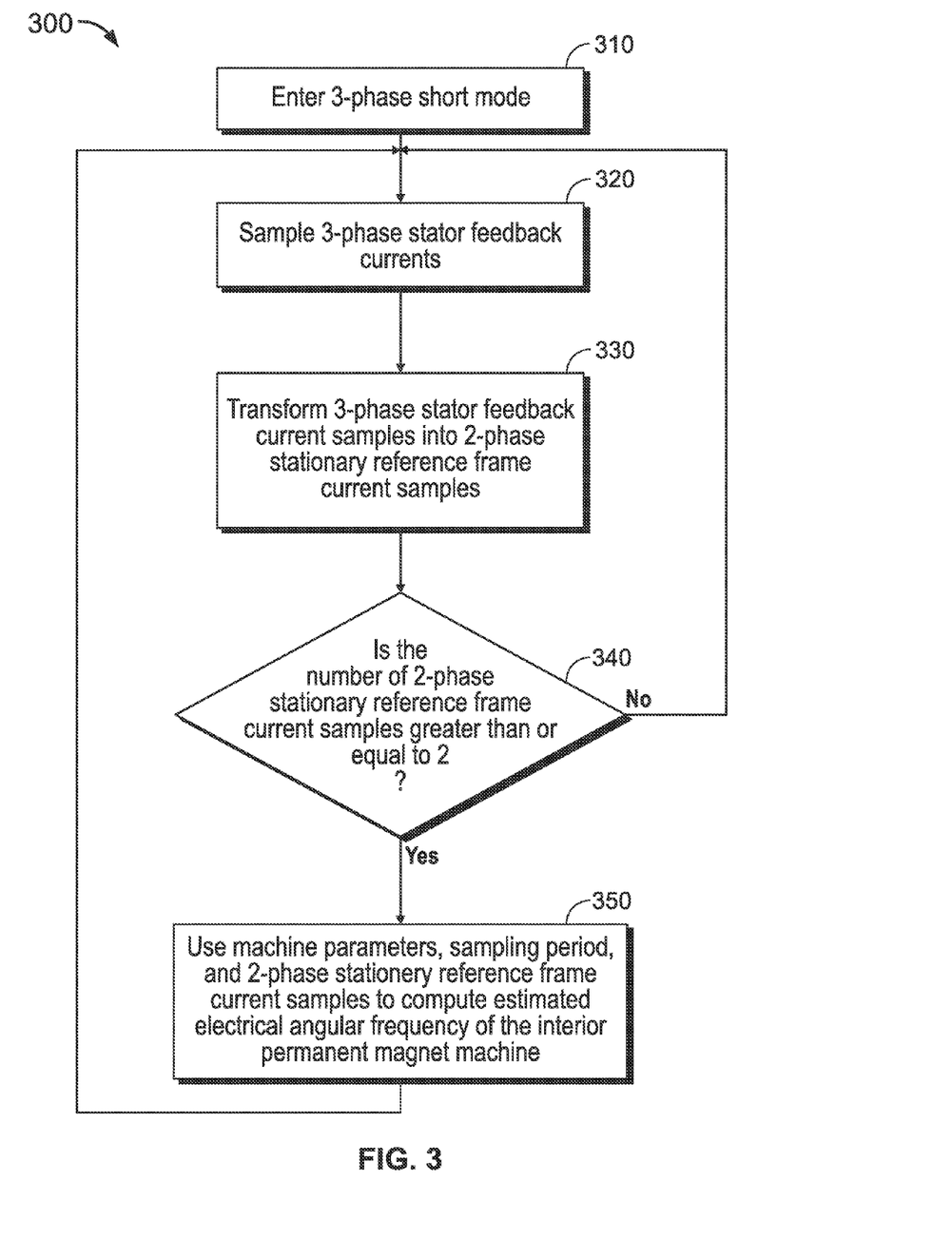
FIG. 3 is a flow chart illustrating a method for estimating electrical angular speed of an interior permanent magnet machine (IPMM) according to one embodiment.
Figure 4:
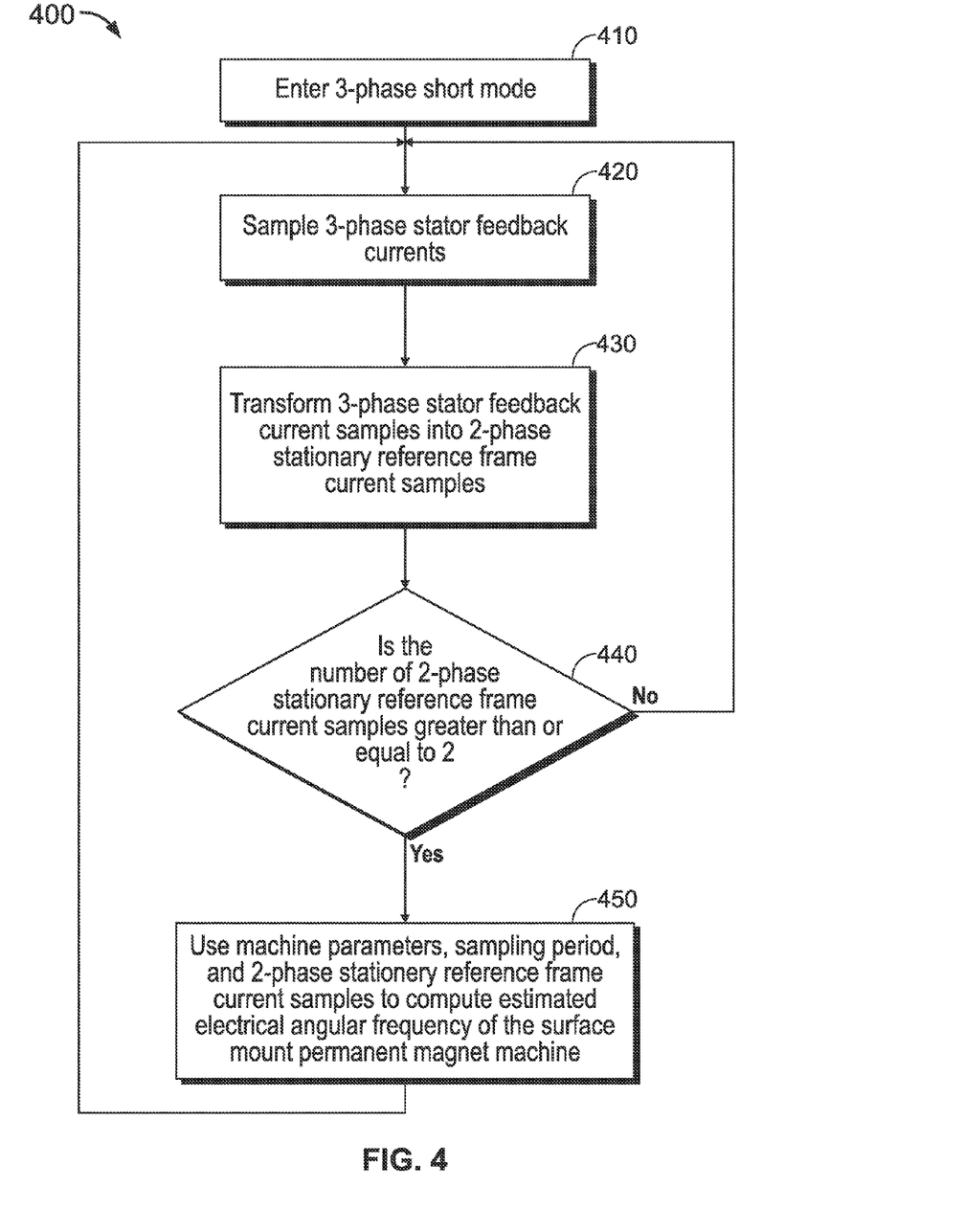
FIG. 4 is a flow chart illustrating a method for estimating electrical angular speed of a surface mount permanent magnet machine (SMPMM) according to another embodiment.

The electrical angular speed estimator module 156 of the controller 200 uses the two-phase stationary reference frame feedback stator currents (Iα, Iβ) 128, 129 along with a sampling period ($T_s$) 152 and machine parameters 154 (e.g., stator resistance ($R_s$), a stator inductance ($L_s$) that can be decomposed into a d-axis stator inductance ($L_d$) and q-axis stator inductance ($L_q$)) to compute the estimated electrical angular speed ($\omega_{est}$) 158 as will be described below with respect to FIGS. 3 and 4.

The electrical angular position estimator module 160 can use the estimated electrical angular speed ($\omega_{est}$) 158 to compute an estimated electrical angular position ($\theta_{est}$) 162.

The open/short controller module 164 can receive the estimated electrical angular speed ($\omega_{est}$) 158 and/or the estimated electrical angular position ($\theta_{est}$) 162, and when enabled, can generate control signals 201 that are used to control the PWM module 108. In one embodiment, when the open/short controller module 164 receives the estimated electrical angular speed ($\omega_{est}$) 158, the open/short controller module 164 determines, based on the estimated electrical angular speed ($\omega_{est}$) 158, whether an open-circuit fault response or a short-circuit fault response should be applied at the inverter module 110, and can then generate control signals 202-1 ... 201-3 that are provided to the PWM module 108 to cause either the open-circuit fault response or the short-circuit fault response to be applied at the inverter module 110. The control signals 202-1 ... 201-3 that are provided to the PWM module 108 can be referred to as either open-circuit fault response control signals 201, or short-circuit fault response control signals 201.

In one embodiment, the open/short controller module 164 compares the estimated electrical angular speed ($\omega_{est}$) 158 to a transition angular velocity threshold ($\omega_{Tth}$). In one implementation, the transition angular velocity threshold ($\omega_{Tth}$) can be a fixed predetermined angular velocity and is defined based on parameters characteristic of the multi-phase electric PMM. In another implementation, the transition angular velocity threshold ($\omega_{Tth}$) can be an adjusted predetermined angular velocity and is defined based on parameters characteristic of the multi-phase electric machine adjusted according to at least one of a temperature of the multi-phase electric machine and a voltage of a voltage source.

In either implementation, when the open/short controller module 164 determines that the estimated electrical angular speed ($\omega_{est}$) 158 is less than or equal to the transition angular velocity threshold ($\omega_{Tth}$), the open/short controller module 164 generates open-circuit fault response control signals 201-1 ... 201-3 that will cause an open-circuit fault response at the inverter module 110. When an open-circuit fault response is applied at the inverter module 110, the open-circuit fault response control signals 201 are designed to cause the output signals 109 from PWM module 108 to open all switches 182, 184, 186, 188, 190, 192 within the inverter module 110, and thus effectively place the switches 182, 184, 186, 188, 190, 192 in the inverter module 110 in an open state (also known as a three-phase open-circuit fault response).

When the open/short controller module 164 determines that the estimated electrical angular speed ($\omega_{est}$) 158 is greater than the transition angular velocity threshold ($\omega_{Tth}$), the open/short controller module 164 generates short-circuit fault response control signals 201-1 ... 201-3 that will cause a short-circuit fault response at the inverter module 110. When the short-circuit fault response is applied at the inverter module 110, the close response control signals 201 are designed to cause the output signals 109 from PWM module 108 to close selected ones of the switches (e.g., 182, 186, 190, or 184, 188, 192) within the inverter module 110 to connect all phases of the inverter module 110 to a single bus (e.g., either the plus bus or the minus bus), and to cause all other non-selected switches (184, 188, 192, or 182, 186, 190) in the inverter module 110 to be open such that the non-selected switches are not connected to the single bus (e.g., either the plus bus or the minus bus). Collectively, this can be referred to as a three-phase short operating mode or short-circuit fault response, where half of the switches of the inverter module 110 are in a shorted state.

Conventional Approach for Estimation of Electrical Angular Speed

In accordance with one conventional method, the electrical angular speed ($\omega_{est}$) of a permanent magnet machine (PMM) can be estimated as follows. The magnitude ($I_s$) of the two-phase stationary reference frame feedback stator currents ($I\alpha$, $I\beta$) can be computed per equation (3) as follows:

$$I_s = \sqrt{I_\alpha^2 + I_\beta^2} \quad (3).$$

The magnitude change of the stator current ($\Delta I_s$) between two sampling periods can be computed using equation (4) as follows:

$$\Delta I_s(k+1) = \sqrt{(i_\alpha(k+1) - i_\alpha(k))^2 + (i_\beta(k+1) - i_\beta(k))^2} \quad (4),$$

where $i_\alpha(k)$ is two-phase α-axis component of the stationary reference frame feedback stator current sample at a first (or current) sample point of the state space vector (or a first cycle of the PWM signal), $i_\beta(k)$ is a two-phase β-axis component of the stationary reference frame feedback stator current sample at a first (or current) sample point (or a first cycle of the PWM signal), $i_\alpha(k+1)$ is two-phase α-axis component of the stationary reference frame feedback stator current sample at a second sample point of the state space vector (or a second cycle of the PWM signal), and $i_\beta(k+1)$ is two-phase β-axis component of the stationary reference frame feedback stator current sample at a second sample point of the state space vector (or a second cycle of the PWM signal).

An estimated electrical angular speed ($\omega_{est}$) can be calculated based on the magnitude change of the stator current ($\Delta I_s$) per equation (5) as follows:

$$\omega_{est}(k+1) = \frac{\Delta I_s(k+1)}{I_s T}, \quad (5)$$

While using these samples (($i_\alpha(k)$, $i_\alpha(k+1)$, $i_\beta(k)$, $i_\beta(k+1)$)) alone may be effective during a normal operating mode, in other scenarios, such as during a three-phase short operating mode, the estimated electrical angular speed ($\omega_{est}$) that is computed can be very oscillatory and/or depends, for example, on initial conditions at instant of the three-phase short and/or machine parameters. In addition, these conventional techniques for estimating speed of an AC PMM can be inadequate since it is necessary to wait for the system to settle from a transient to a steady state phase of the three-phase short operating mode. As such, existing techniques for estimating electrical angular speed (or angular speed) of the PMM can be inadequate since the estimation can be delayed for a waiting time (e.g., a time needed for the DC component of the stator current to decay to a steady state value during three-phase short operating mode of the PMM). In many practical systems, such as hybrid and/or electric vehicles, such as those that employ permanent magnet machines, this can be problematic and/or unacceptable in terms of resultant performance.

Improved Estimation of Electrical Angular Speed

In accordance with the disclosed embodiments, methods, systems and apparatus are provided for estimating electrical angular speed (and/or angular position) of a permanent magnet machine (PMM). As will be described below, a difference (or differential) equation for stator current is derived, and dependence on the initial and steady state values of the synchronous reference frame d-axis flux component ($\Psi_{dss}$) and q-axis flux component ($\Psi_{qss}$) are eliminated. As will be explained below, the estimated speed or "electrical angular speed" that is computed using this difference equation shows very fast convergence for a PMM (e.g., surface mounted PMM, interior PMM, and other low saliency machines). These methods, systems and apparatus allow for electrical angular speed (and/or angular position) to be estimated during a transient phase of the three-phase short operating mode (e.g., when a short-circuit fault response is applied at an inverter module) without having to wait for the system to settle to a steady state value. The disclosed embodiments can be used during a three-phase short operating mode before transients of the three-phase short stator current decay to a steady state value. The disclosed embodiments can help reduce the time needed to compute an estimated electrical angular speed (or angular position) of the permanent magnet machine. The disclosed embodiments can be used to estimate electrical angular speed of a PMM when speed and/or position sensors are unavailable. The disclosed embodiments can help increase the accuracy of the estimated electrical angular speed. The disclosed embodiments can help are more robust to variations of machine parameters.

Prior to describing some exemplary embodiments, a description will be provided that was used to derive equations for estimating electrical angular speed ($\omega_{est}$) of a PMM during a transient phase of the three-phase short operating mode.

During the three-phase short operating mode, a differential equation for synchronous flux distribution can be written as shown in equations (6) through (12) as follows:

$$\frac{d}{dt}\begin{bmatrix}\Psi_d(t)\\ \Psi_q(t)\end{bmatrix} = A\begin{bmatrix}\Psi_d(t)\\ \Psi_q(t)\end{bmatrix} + B, \tag{6}$$

where $$\Psi_d(t) = \Psi_{PM} + L_d i_d(t), \tag{7}$$

$$\frac{d\Psi_d(t)}{dt} = -R_s i_d + \omega_e \Psi_q(t), \tag{8}$$

$$\Psi_q(t) = L_q i_q(t), \tag{9}$$

$$\frac{d\Psi_q(t)}{dt} = -R_s i_q - \omega_e \Psi_d(t), \tag{10}$$

$$A = \begin{bmatrix} -\frac{R_s}{L_d} & \omega_e \\ -\omega_e & -\frac{R_s}{L_q} \end{bmatrix}, \tag{11}$$

$$B = \begin{bmatrix} -\frac{R_s \Psi_{PM}}{L_d} \\ 0 \end{bmatrix}, \tag{12}$$

and where $\Psi_d$ is the synchronous reference frame d-axis flux component, $\Psi_q$ is the synchronous reference frame q-axis flux component, $R_s$ is the stator resistance, $L_d$ is the synchronous reference frame d-axis inductance component, $L_q$ is the synchronous reference frame q-axis inductance component, $\omega_e$ is the actual electrical angular speed, $\Psi_{PM}$ is the permanent magnet flux, t is time, A is the state space matrix and B is the input matrix. Equation 6 can be solved to provide the flux distribution in the three-phase short operating mode, as follows:

$$\begin{bmatrix}\Psi_d(t)\\ \Psi_q(t)\end{bmatrix} = e^{At}\begin{bmatrix}\Psi_d(0)\\ \Psi_q(0)\end{bmatrix} + \int_0^t e^{A(t-\tau)} B\, d\tau, \tag{13}$$

which can be rewritten as:

$$\begin{bmatrix}\Psi_d(t)\\ \Psi_q(t)\end{bmatrix} = e^{At}\left(\begin{bmatrix}\Psi_d(0)\\ \Psi_q(0)\end{bmatrix} - \begin{bmatrix}\Psi_{dss}\\ \Psi_{qss}\end{bmatrix}\right) + \begin{bmatrix}\Psi_{dss}\\ \Psi_{qss}\end{bmatrix}. \tag{14}$$

As shown in equation (14), the synchronous reference frame d-axis flux component ($\Psi_d$), and the synchronous reference frame q-axis flux component ($\Psi_q$) depend on initial flux conditions, steady state value of the flux (where "ss" indicates steady state value for a given speed), and an exponential part of the response that depends on the state transition matrix (A). The steady state values for synchronous reference frame d-axis flux component ($\Psi_{dss}$) and q-axis flux component ($\Psi_{qss}$) can be written as follows in equation (15):

$$\begin{bmatrix}\Psi_{dss}\\ \Psi_{qss}\end{bmatrix} = A^{-1}B = \begin{bmatrix} R_s^2 \\ -R_s \omega_e L_q \end{bmatrix}\frac{\Psi_{PM}}{R_s^2 + \omega_e^2 L_d L_q}. \tag{15}$$

Thus, the steady state values for synchronous reference frame d-axis flux component ($\Psi_{dss}$) and q-axis flux component ($\Psi_{qss}$) depend on the state transition matrix (A) and the input matrix (B). The state transition matrix (A) depends on machine parameters and actual electrical angular speed ($\omega_e$), and the input matrix (B) depends on machine parameters, actual electrical angular speed ($\omega_e$) and the permanent magnet flux ($\Psi_{PM}$). Cutoff mechanical speeds ($\omega_1$, $\omega_2$) can be defined such that: $\omega_e^2 = \omega_1^2 + \omega_2^2$, which can be rewritten $\omega_2^2 = \omega_e^2 - \omega_1^2$. The speeds ($\omega_1, \omega_2$) can be defined per equations (16A) and (16B) as follows:

$$\omega_1 = \frac{R_s(L_d - L_q)}{2L_d L_q}, \tag{16A}$$

$$\omega_2 = \frac{R_s(L_d + L_q)}{2L_d L_q}. \tag{16B}$$

The value of the transition matrix ($e^{At}$) can be computed per equations (17) through (20) as follows:

$$e^{At} = \begin{bmatrix} \cos(\omega_2 t) + \frac{\omega_1}{\omega_2}\sin(\omega_2 t) & \frac{\omega_e}{\omega_2}\sin(\omega_2 t) \\ -\frac{\omega_e}{\omega_2}\sin(\omega_2 t) & \cos(\omega_2 t) - \frac{\omega_1}{\omega_2}\sin(\omega_2 t) \end{bmatrix} e^{-\alpha t}, \tag{17}$$

for $|\omega_e| > |\omega_1|$ $$e^{At} = \begin{bmatrix} 1 + \omega_1 t & \omega_1 t \\ -\omega_1 t & 1 - \omega_1 t \end{bmatrix} e^{-\alpha t}, \tag{18}$$

for $|\omega_e| = |\omega_1|$ $$e^{At} = \begin{bmatrix} \cosh(\omega_2 t) + \frac{\omega_1}{\omega_2}\sinh(\omega_2 t) & \frac{\omega_e}{\omega_2}\sinh(\omega_2 t) \\ -\frac{\omega_e}{\omega_2}\sinh(\omega_2 t) & \cosh(\omega_2 t) - \frac{\omega_1}{\omega_2}\sinh(\omega_2 t) \end{bmatrix} e^{-\alpha t}, \tag{19}$$

for $|\omega_e| < |\omega_1|$, where $$\alpha = \frac{R_s(L_d + L_q)}{2L_d L_q} = \omega_2 \tag{20}$$

The value of the exponential ($e^{At}$) is computed differently for different values of actual mechanical speed ($\omega_e$) versus speed ($\omega_1$).

Speed Estimation for an Interior Permanent Magnet Machine (IPMM)

FIG. 3 is a flow chart illustrating a method 300 for estimating electrical angular speed ($\omega_{est}$) of an interior permanent magnet machine (IPMM) according to one embodiment of the present invention.

At 310, the fault detection and confirmation module 150 detects that a fault condition has occurred (e.g., a feedback device has experienced a fault or failed), and sends a command (enable signal 151) to the open/short controller module 164 to enter three-phase short operating mode. In one embodiment, the fault condition can be that output from sensors (e.g., speed and/or position sensors) is unavailable.

At 320, the abc reference frame-to-αβ reference frame transformation module 127 samples of three-phase stationary reference frame feedback stator currents ($i_{sa} \ldots i_{sc}$) 122-124.

At 330, the abc reference frame-to-αβ reference frame transformation module 127 transforms or converts the three-phase stationary reference frame feedback stator current samples ($i_{sa}(k) \ldots i_{sc}(k)$)) into two-phase stationary reference frame feedback stator current samples ($i_\alpha(k)$, $i_\beta(k)$), and the electrical angular speed estimator module 156 stores the samples for further processing. When three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) have been obtained and stored at the electrical angular speed estimator module 156, the electrical angular speed estimator module 156 can then use the two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) to generate an estimated electrical angular speed ($\omega_{est}(k)$) of the interior permanent magnet machine (IPMM).

At 340, the electrical angular speed estimator module 156 determines whether three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) have been obtained and stored. If so, then the method 300 proceeds to 350. If not, the method 300 loops back to 320 so that additional samples can be obtained.

When three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) have been obtained and stored at the electrical angular speed estimator module 156, at 350, the electrical angular speed estimator module 156 uses the two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) to generate an estimated electrical angular speed ($\omega_{est}(k)$) of the interior permanent magnet machine (IPMM).

From the flux equation, by eliminating initial position and initial flux values, a difference equation for the stator current can be derived in equations (21) through (25) as follows:

$$\begin{bmatrix} i_\alpha(k+2) \\ i_\beta(k+2) \end{bmatrix} - K(k+1) \begin{bmatrix} i_\alpha(k+1) \\ i_\beta(k+1) \end{bmatrix} = \tag{21}$$

$$e^{J\omega_e T} \left( \begin{bmatrix} i_\alpha(k+1) \\ i_\beta(k+1) \end{bmatrix} - K(k) \begin{bmatrix} i_\alpha(k) \\ i_\beta(k) \end{bmatrix} \right)$$

$$J = \begin{bmatrix} 0 & -1 \\ 1 & 0 \end{bmatrix}, \tag{22}$$

$$K(k) = e^{-\alpha T} \begin{bmatrix} 1 + (\gamma-1)(\omega_{est}(k)T)^2 & (\gamma-1)\omega_{est}(k)T \\ -(\gamma-1)\omega_{est}(k)T & 1 + (\gamma-1)(\omega_{est}(k)T)^2 \end{bmatrix}, \tag{23}$$

$$\gamma = \frac{L_d^2 + L_q^2}{2L_d L_q}, \tag{24}$$

$$\alpha = \frac{R_s(L_d + L_q)}{2L_d L_q}, \tag{25}$$

where K(k) is a dimensionless gain matrix, and k is an index that corresponds to a first sample point (e.g., a value that corresponds to particular sample point or a particular cycle of the PWM signal), T is sampling time, $i_\alpha(k)$ is two-phase α-axis component of the stationary reference frame feedback stator current sample at the first sample point, $i_\alpha(k+1)$ is two-phase α-axis component of the stationary reference frame feedback stator current sample at a second sample point, $i_\alpha(k+2)$ is two-phase α-axis component of the stationary reference frame feedback stator current sample at a third sample point, $i_\beta(k)$ is a two-phase β-axis component of the stationary reference frame feedback stator current sample at the first sample point, $i_\beta(k+1)$ is two-phase β-axis component of the stationary reference frame feedback stator current sample at the second sample point, and $i_\beta(k+2)$ is a two-phase β-axis component of the stationary reference frame feedback stator current sample at the third sample point, γ is dimensionless coefficient that is computed based on a d-axis stator inductance ($L_d$) and a q-axis stator inductance ($L_q$), α is machine parameter that is computed based on the d-axis stator inductance ($L_d$), the q-axis stator inductance ($L_q$) and the stator resistance ($R_s$), and J is a matrix equivalent for imaginary unit $\sqrt{-1}$.

In one embodiment, the estimated electrical angular speed ($\omega_{est}(k)$) can be computed at the electrical angular speed estimator module 156 based on equations (26) through (32) as follows:

$$\omega_{est} = \frac{1}{T} \arctan \frac{di_{\alpha 1/\beta} di_{\beta 2/\alpha 1} - di_{\alpha 2/\beta 1} di_{\beta 1/\alpha}}{di_{\alpha 1/\beta} di_{\alpha 2/\beta 1} + di_{\beta 1/\alpha} di_{\beta 2/\alpha 1}}, \tag{26}$$

where $$di_{\alpha 1/\beta} = i_\alpha(k+1) - k_1 i_\alpha(k) - k_2 i_\beta(k) \tag{27}$$

$$di_{\alpha 2/\beta 1} = i_\alpha(k+2) - k_1 i_\alpha(k+1) - k_2 i_\beta(k+1) \tag{28}$$

$$di_{\beta 1/\alpha} = i_\beta(k+1) - k_1 i_\beta(k) + k_2 i_\alpha(k) \tag{29}$$

$$di_{\beta 2/\alpha 1} = i_\beta(k+2) - k_1 i_\beta(k+1) + k_2 i_\alpha(k+1) \tag{30}$$

$$k_1 = (1 + (\gamma-1)(\omega_{est}(k)T)^2)e^{-\alpha T} \tag{31}$$

$$k_2 = (\gamma-1)\omega_{est}(k)T e^{-\alpha T}, \tag{32}$$

where $di_{\alpha 1/\beta}$ is a first α-axis/β-axis current difference, $di_{\alpha 2/\beta 1}$ is a second α-axis/β-axis current difference, $di_{\beta 1/\alpha}$ is a first β-axis/α-axis current difference, $di_{\beta 2/\alpha 1}$ is a second β-axis/α-axis current difference, $k_1$ is the diagonal element of the dimensionless gain matrix K(k), and $k_2$ is the sub-diagonal element of the dimensionless gain matrix K(k).

Speed Estimation for a Surface Mount Permanent Magnet Machine (SMPMM)

FIG. 4 is a flow chart illustrating a method 400 for estimating electrical angular speed ($\omega_{est}$) of a surface mount permanent magnet machine (SMPMM) according to another embodiment of the present invention.

Events 410-430 are identical to events 310-330 and will not be repeated for sake of brevity.

At 440, the electrical angular speed estimator module 156 determines whether three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) have been obtained and stored. If so, then the method 400 proceeds to 450. If not, the method 400 loops back to 420 so that additional samples can be obtained. When three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) have been obtained and stored, at 450, the electrical angular speed estimator module 156 uses the two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) to generate an estimated electrical angular speed ($\omega_{est}(k)$) of the surface mount permanent magnet machine (SMPMM).

For a SMPMM, the dimensionless gain matrix of equation (23) above simplifies to a dimensionless constant (K) as follows:

$$K(k) = K = e^{-\frac{R_s T}{L_s}} \text{ for } L_s = L_q = L_d. \quad (33)$$

In other words, for the SMPMM, the dimensionless gain matrix (of equation (23) for an IPMM) simplifies to diagonal matrix with the diagonal element (K).

The estimated electrical angular speed ($\omega_{est}(k)$) can be computed based on equations (34) through (38) as follows:

$$\omega_{est} = \frac{1}{T}\arctan\frac{di_{\alpha 1}di_{\beta 2} - di_{\alpha 2}di_{\beta 1}}{di_{\alpha 1}di_{\alpha 2} + di_{\beta 1}di_{\beta 2}}, \quad (34)$$

where $$di_{\alpha 1} = i_\alpha(k+1) - Ki_\alpha(k), \quad (35)$$

$$di_{\alpha 2} = i_\alpha(k+2) - Ki_\alpha(k+1), \quad (36)$$

$$di_{\beta 1} = i_\beta(k+1) - Ki_\beta(k), \quad (37)$$

$$di_{\beta 2} = i_\beta(k+2) - Ki_\beta(k+1), \quad (38)$$

where $di_{\alpha 1}$ is a first α-axis current difference, $di_{\alpha 2}$ is a second α-axis current difference, $di_{\beta 1}$ is a first β-axis current difference, $di_{\beta 2}$ is a second β-axis current difference, K(k) is a dimensionless gain matrix and k is value that corresponds to particular sample point or a particular cycle of the PWM signal, T is sampling time, $L_s$ is a stator inductance that can be decomposed into a d-axis stator inductance ($L_d$) and q-axis stator inductance ($L_q$), and $R_s$ is stator resistance.

Figure 5:
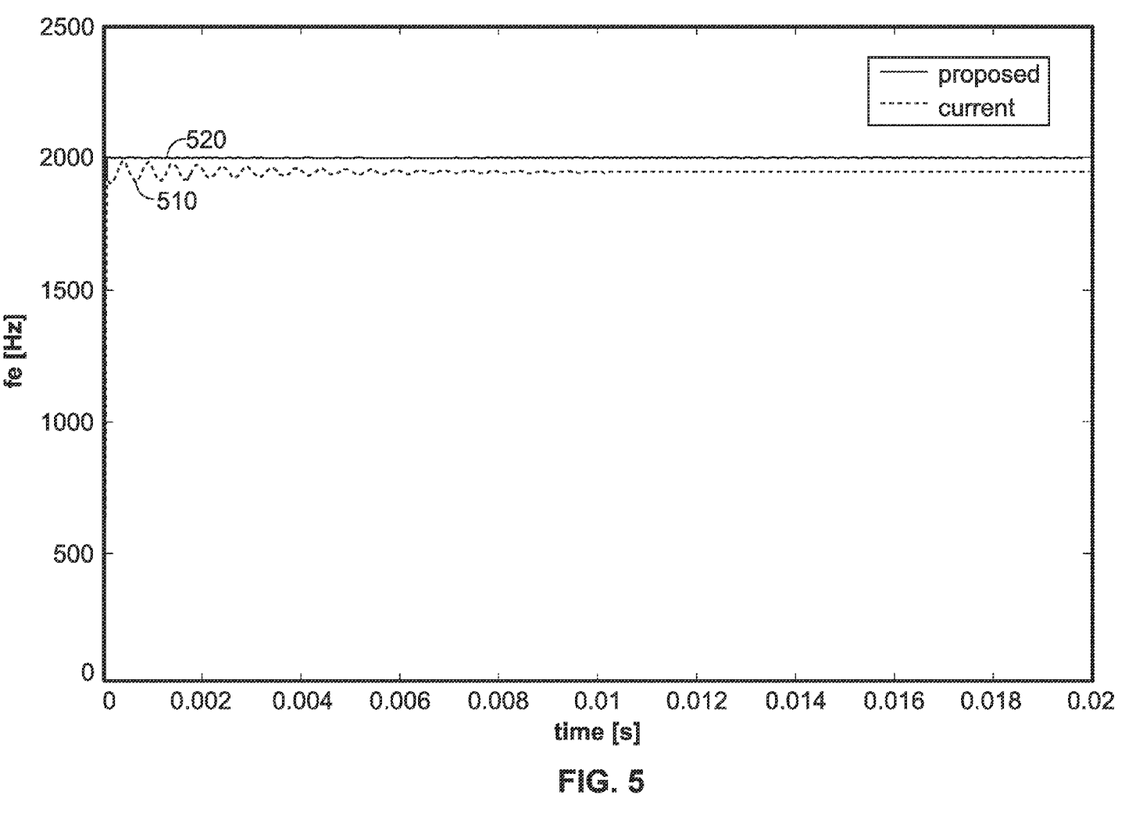
FIG. 5 are graphs that illustrate electrical angular speed as a function of time for (1) a system that employs a conventional technique for estimating electrical angular speed of a permanent magnet machine (PMM) and (2) for a system that employs the disclosed techniques for estimating electrical angular speed of a permanent magnet machine (PMM).

FIG. 5 illustrates a graph 510 of electrical angular speed as a function of time for a system that employs a conventional technique for estimating electrical angular speed of a permanent magnet machine (PMM). By contrast, graph 520 shows electrical angular speed as a function of time for a system that employs the disclosed techniques for estimating electrical angular speed of a PMM. Graph 520 illustrates that the estimated electrical angular speed converges much faster, and has improved accuracy in contrast to graph 510.

In one exemplary implementation, the multi-phase machine can be implemented in operating environments such as a hybrid/electric vehicle (HEV). In some exemplary implementations, the control techniques and technologies described can be applied to permanent magnet machines used in a hybrid/electric vehicle. However, it will be appreciated by those skilled in the art that the same or similar techniques and technologies can be applied in the context of other systems in which it is desirable to control operation of a multi-phase system that includes a multi-phase alternating current machine without using angular speed (or "electrical angular frequency") sensor or angular position sensor. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

In addition, the electric machine described above and the power inverter may have different numbers of phases, such as two or more. Other forms of power sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for computing an estimated electrical angular speed of a permanent magnet machine, comprising:
    determining, at an electrical angular speed estimator module, whether three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) have been stored;
    when three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) have been stored at the electrical angular speed estimator module:
    computing, at the electrical angular speed estimator module, an estimated electrical angular speed ($\omega_{est}(k)$) of the permanent magnet machine based on the three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$) stored at the electrical angular speed estimator module, and a dimensionless gain that is computed based on a sampling time (T) and machine parameters.

2. A method according to claim 1, wherein the machine parameters comprise: a stator inductance ($L_s$) and a stator resistance ($R_s$).

3. A method according to claim 1, wherein the permanent magnet machine is a surface mount permanent magnet machine, and wherein the step of computing comprises:
    computing, at the electrical angular speed estimator module, the estimated electrical angular speed ($\omega_{est}(k)$) of the surface mount permanent magnet machine (SMPMM) based on an equation:

$$\omega_{est} = \frac{1}{T}\arctan\frac{di_{\alpha 1}di_{\beta 2} - di_{\alpha 2}di_{\beta 1}}{di_{\alpha 1}di_{\alpha 2} + di_{\beta 1}di_{\beta 2}},$$

wherein T is sampling time, wherein $di_{\alpha 1}$ is a first α-axis current difference at a first sample point and a second sample point, wherein $di_{\alpha 2}$ is a second α-axis current difference at the second sample point and a third sample point, wherein $di_{\beta 1}$ is a first β-axis current difference at the first sample point and the second sample point, wherein $di_{\beta 2}$ is a second β-axis current difference at the second sample point and the third sample point.

4. A method according to claim 3, wherein the dimensionless gain (K) is computed based on an equation:

$$K = e^{-\frac{R_s T}{L_s}},$$

wherein $L_s$ a stator inductance ($L_d$), and $R_s$ is a stator resistance ($R_s$).

5. A method according to claim 4, wherein the first α-axis current difference ($di_{\alpha 1}$), the second α-axis current difference ($di_{\alpha 2}$), the first β-axis current difference ($di_{\beta 1}$), and the second β-axis current difference ($di_{\beta 2}$) are computed based on equations:

$$di_{\alpha 1} = i_\alpha(k+1) - K i_\alpha(k),$$

$$di_{\alpha 2} = i_\alpha(k+2) - K i_\alpha(k+1),$$

$$di_{\beta 1} = i_\beta(k+1) - K i_\beta(k),$$

$$di_{\beta 2} = i_\beta(k+2) - K i_\beta(k+1),$$

respectively, and wherein k is an index that corresponds to a first sample point, K is the dimensionless gain, $i_\alpha(k)$ is a two-phase α-axis component of the stationary reference frame feedback stator current sample at the first sample point, $i_\alpha(k+1)$ is a two-phase α-axis component of the stationary reference frame feedback stator current sample at a second sample point, $i_\alpha(k+2)$ is a two-phase α-axis component of the stationary reference frame feedback stator current sample at a third sample point, $i_\beta(k)$ is a two-phase β-axis component of the stationary reference frame feedback stator current sample at the first sample point, $i_\beta(k+1)$ is a two-phase β-axis component of the stationary reference frame feedback stator current sample at the second sample point, and $i_\beta(k+2)$ is a two-phase β-axis component of the stationary reference frame feedback stator current sample at the third sample point.

6. A method according to claim 1, wherein the permanent magnet machine is an interior permanent magnet machine, and wherein the step of computing comprises:
   computing, at the electrical angular speed estimator module, the estimated electrical angular speed ($\omega_{est}(k)$) of the interior permanent magnet machine (IPMM) based on an equation:

$$\omega_{est} = \frac{1}{T} \arctan \frac{di_{\alpha 1/\beta} di_{\beta 2/\alpha 1} - di_{\alpha 2/\beta 1} di_{\beta 1/\alpha}}{di_{\alpha 1/\beta} di_{\alpha 2/\beta 1} + di_{\beta 1/\alpha} di_{\beta 2/\alpha 1}},$$

where T is sampling time, $di_{\alpha 1/\beta}$ is a first α-axis/β-axis current difference at a first sample point and a second sample point, $di_{\beta 1/\alpha}$ is a first β-axis/α-axis current difference at the first sample point and the second sample point, $di_{\alpha 2/\beta 1}$ is a second α-axis/β-axis current difference at the second sample point and a third sample point, and $di_{\beta 2/\alpha 1}$ is a second β-axis/α-axis current difference at the second sample point and the third sample point.

7. A method according to claim 6, wherein the dimensionless gain comprises a dimensionless gain matrix K(k) that is computed based on an equation:

$$K(k) = e^{-\alpha T} \begin{bmatrix} 1 + (\gamma - 1)(\omega_{est}(k)T)^2 & (\gamma - 1)\omega_{est}(k)T \\ -(\gamma - 1)\omega_{est}(k)T & 1 + (\gamma - 1)(\omega_{est}(k)T)^2 \end{bmatrix},$$

where k is an index that corresponds to the first sample point, α is machine parameter that is computed based on a d-axis stator inductance ($L_d$), a q-axis stator inductance ($L_q$), and a stator resistance ($R_s$), and γ is dimensionless coefficient that is computed based on a d-axis stator inductance ($L_d$) and a q-axis stator inductance ($L_q$).

8. A method according to claim 7, wherein the first α-axis/β-axis current difference ($di_{\alpha 1/\beta}$), the second α-axis/β-axis current difference ($di_{\alpha 2/\beta 1}$), the first β-axis/α-axis current difference ($di_{\beta 1/\alpha}$), and the second β-axis/α-axis current difference ($di_{\beta 2/\alpha 1}$) are computed based on equations:

$$di_{\alpha 1/\beta} = i_\alpha(k+1) - k_1 i_\alpha(k) - k_2 i_\beta(k),$$

$$di_{\alpha 2/\beta 1} = i_\alpha(k+2) - k_1 i_\alpha(k+1) - k_2 i_\beta(k+1),$$

$$di_{\beta 1/\alpha} = i_\beta(k+1) - k_1 i_\beta(k) + k_2 i_\alpha(k),$$

$$di_{\beta 2/\alpha 1} = i_\beta(k+2) - k_1 i_\beta(k+1) + k_2 i_\alpha(k+1),$$

respectively, where $k_1$ is a diagonal element of the dimensionless gain matrix K(k) and $k_2$ is a sub-diagonal element of the dimensionless gain matrix K(k), $i_\alpha(k)$ is a two-phase α-axis component of the stationary reference frame feedback stator current sample at the first sample point, $i_\alpha(k+1)$ is a two-phase a-axis component of the stationary reference frame feedback stator current sample at a second sample point, $i_\alpha(k+2)$ is a two-phase α-axis component of the stationary reference frame feedback stator current sample at a third sample point, $i_\beta(k)$ is a two-phase β-axis component of the stationary reference frame feedback stator current sample at the first sample point, $i_\beta(k+1)$ is two-phase β-axis component of the stationary reference frame feedback stator current sample at the second sample point, and $i_\beta(k+2)$ is a two-phase β-axis component of the stationary reference frame feedback stator current sample at the third sample point.

9. A method according to claim 1, further comprising:
   detecting, at a fault detection and confirmation module, that a fault condition has occurred; and
   communicating, a command to an open/short controller module to enter a three-phase short operating mode.

10. A method according to claim 1, further comprising:
    sampling, at an abc reference frame-to-αβ reference frame transformation module, samples of three-phase stationary reference frame feedback stator currents ($i_{sa} \ldots i_{sc}$);
    transforming, at the abc reference frame-to-αβ reference frame transformation module, the three-phase stationary reference frame feedback stator current samples ($i_{sa}(k) \ldots i_{sc}(k)$) into two-phase stationary reference frame feedback stator current samples ($i_\alpha(k), i_\beta(k)$); and
    storing, at the electrical angular speed estimator module, the two-phase stationary reference frame feedback stator current samples ($i_\alpha(k), i_\beta(k)$).

11. A drive system for a permanent magnet machine, the drive system comprising:
    a controller, comprising:
        an electrical angular speed estimator module configured to compute an estimated electrical angular speed ($\omega_{est}(k)$) of the permanent magnet machine based on three or more two-phase stationary reference frame feedback stator current samples ($i_\alpha(k), i_\alpha(k+1), i_\alpha(k+2), i_\beta(k), i_\beta(k+1), i_\beta(k+2)$), and a dimensionless gain (K) that is computed based on a sampling time (T) and machine parameters.

12. A system according to claim 11, wherein the machine parameters comprise: a stator inductance ($L_s$) and a stator resistance ($R_s$).

13. A system according to claim 11, wherein the permanent magnet machine is a surface mount permanent magnet machine, and wherein the electrical angular speed estimator module is configured to compute the estimated electrical angular speed ($\omega_{est}(k)$) of the surface mount permanent magnet machine based on an equation:

$$\omega_{est} = \frac{1}{T}\arctan\frac{di_{\alpha 1}di_{\beta 2} - di_{\alpha 2}di_{\beta 1}}{di_{\alpha 1}di_{\alpha 2} + di_{\beta 1}di_{\beta 2}},$$

wherein T is sampling time, wherein $di_{\alpha 1}$ is a first α-axis current difference at a first sample point and a second sample point, wherein $di_{\alpha 2}$ is a second α-axis current difference at the second sample point and a third sample point, wherein $di_{\beta 1}$ is a first β-axis current difference at the first sample point and the second sample point, wherein $di_{\beta 2}$ is a second β-axis current difference at the second sample point and the third sample point.

14. A system according to claim 13, wherein the dimensionless gain (K) is computed based on an equation:

$$K = e^{-\frac{R_s T}{L_s}},$$

where $L_s$ a stator inductance ($L_d$), and $R_s$ is a stator resistance ($R_s$).

15. A system according to claim 14, wherein the electrical angular speed estimator module is configured to compute the first α-axis current difference ($di_{\alpha 1}$), the second α-axis current difference ($di_{\alpha 2}$), the first β-axis current difference ($di_{\beta 1}$), and the second β-axis current difference ($di_{\beta 2}$) based on equations:

$di_{\alpha 1} = i_\alpha(k+1) - Ki_\alpha(k),$ $di_{\alpha 2} = i_\alpha(k+2) - Ki_\alpha(k+1),$ $di_{\beta 1} = i_\beta(k+1) - Ki_\beta(k),$ $di_{\beta 2} = i_\beta(k+2) - Ki_\beta(k+1),$ respectively, where k is an index that corresponds to a first sample point, K is the dimensionless gain, $i_\alpha(k)$ is a two-phase α-axis component of the stationary reference frame feedback stator current sample at the first sample point, $i_\alpha(k+1)$ is a two-phase α-axis component of the stationary reference frame feedback stator current sample at a second sample point, $i_\alpha(k+2)$ is a two-phase α-axis component of the stationary reference frame feedback stator current sample at a third sample point, $i_\beta(k)$ is a two-phase β-axis component of the stationary reference frame feedback stator current sample at the first sample point, $i_\beta(k+1)$ is a two-phase β-axis component of the stationary reference frame feedback stator current sample at the second sample point, and $i_\beta(k+2)$ is a two-phase β-axis component of the stationary reference frame feedback stator current sample at the third sample point.

16. A system according to claim 11, wherein the permanent magnet machine is an interior permanent magnet machine, and wherein the electrical angular speed estimator module is configured to compute the estimated electrical angular speed ($\omega_{est}(k)$) of the interior permanent magnet machine based on an equation:

$$\omega_{est} = \frac{1}{T}\arctan\frac{di_{\alpha 1/\beta}di_{\beta 2/\alpha 1} - di_{\alpha 2/\beta 1}di_{\beta 1/\alpha}}{di_{\alpha 1/\beta}di_{\alpha 2/\beta 1} + di_{\beta 1/\alpha}di_{\beta 2/\alpha 1}},$$

where T is sampling time, $di_{\alpha 1/\beta}$ is a first α-axis/β-axis current difference at a first sample point and a second sample point, $di_{\beta 1/\alpha}$ is a first β-axis/α-axis current difference at the first sample point and the second sample point, $di_{\alpha 2/\beta 1}$ is a second α-axis/β-axis current difference at the second sample point and a third sample point, and $di_{\beta 2/\alpha 1}$ is a second β-axis/α-axis current difference at the second sample point and the third sample point.

17. A system according to claim 16, wherein the dimensionless gain comprises a dimensionless gain matrix K(k), wherein the electrical angular speed estimator module is configured to compute the dimensionless gain matrix K(k) based on an equation:

$$K(k) = e^{-\alpha T}\begin{bmatrix} 1+(\gamma-1)(\omega_{est}(k)T)^2 & (\gamma-1)\omega_{est}(k)T \\ -(\gamma-1)\omega_{est}(k)T & 1+(\gamma-1)(\omega_{est}(k)T)^2 \end{bmatrix},$$

where k is an index that corresponds to the first sample point, α is machine parameter that is computed based on a d-axis stator inductance ($L_d$), a q-axis stator inductance ($L_q$), and a stator resistance ($R_s$), and wherein γ is dimensionless coefficient that is computed based on a d-axis stator inductance ($L_d$) and a q-axis stator inductance ($L_q$).

18. A system according to claim 17, wherein the first α-axis/β-axis current difference ($di_{\alpha 1/\beta}$), the second α-axis/β-axis current difference ($di_{\alpha 2/\beta 1}$), the first β-axis/α-axis current difference ($di_{\beta 1/\alpha}$), and the second β-axis/α-axis current difference ($di_{\beta 2/\alpha 1}$) are computed based on equations:

$di_{\alpha 1/\beta} = i_\alpha(k+1) - k_1 i_\alpha(k) - k_2 i_\beta(k),$ $di_{\alpha 2/\beta 1} = i_\alpha(k+2) - k_1 i_\alpha(k+1) - k_2 i_\beta(k+1),$ $di_{\beta 1/\alpha} = i_\beta(k+1) - k_1 i_\beta(k) + k_2 i_\alpha(k),$ $di_{\beta 2/\alpha 1} = i_\beta(k+2) - k_1 i_\beta(k+1) + k_2 i_\alpha(k+1),$ respectively, where $k_1$ is a diagonal element of the dimensionless gain matrix K(k) and $k_2$ is a sub-diagonal element of the dimensionless gain matrix K(k), $i_\alpha(k)$ is a two-phase α-axis component of the stationary reference frame feedback stator current sample at the first sample point, $i_\alpha(k+1)$ is a two-phase a-axis component of the stationary reference frame feedback stator current sample at a second sample point, $i_\alpha(k+2)$ is a two-phase α-axis component of the stationary reference frame feedback stator current sample at a third sample point, $i_\beta(k)$ is a two-phase β-axis component of the stationary reference frame feedback stator current sample at the first sample point, $i_\beta(k+1)$ is two-phase β-axis component of the stationary reference frame feedback stator current sample at the second sample point, and $i_\beta(k+2)$ is a two-phase β-axis component of the stationary reference frame feedback stator current sample at the third sample point.

19. A system according to claim 11, further comprising:
an inverter module comprising switches;
a fault detection and confirmation module configured to detect that a fault condition has occurred, and generate a command to enter a three-phase short operating mode; and
an open/short controller module configured to receive the command and to generate control signals that cause switches of the inverter module to be configured in the three-phase short operating mode; and an abc reference frame-to-αβ reference frame transformation module configured to sample three-phase stationary reference frame feedback stator currents ($i_{sa} \ldots i_{sc}$) and to transform the samples of the three-phase stationary reference frame feedback stator currents ($i_{sa} \ldots i_{sc}$) into two-phase stationary reference frame feedback stator current samples ($i_\alpha(k)$, $i_\beta(k)$), and wherein the electrical angular speed estimator module is configured to store the two-phase stationary reference frame feedback stator current samples ($i_\alpha(k)$, $i_\beta(k)$).

20. A controller for a permanent magnet machine, comprising:

an inverter module comprising switches;

a fault detection and confirmation module configured to detect that a fault condition has occurred, and generate a command to enter a three-phase short operating mode; and an open/short controller module configured to receive the command and to generate control signals that cause switches of the inverter module to be configured in the three-phase short operating mode;

an abc reference frame-to-αβ reference frame transformation module configured to sample three-phase stationary reference frame feedback stator currents ($i_{sa} \ldots i_{sc}$) and to transform the samples of the three-phase stationary reference frame feedback stator currents ($i_{sa} \ldots i_{sc}$) into two-phase stationary reference frame feedback stator current samples ($i_\alpha(k)$, $i_\beta(k)$); and an electrical angular speed estimator module configured to compute an estimated electrical angular speed ($\omega_{est}(k)$) of the permanent magnet machine based on: three or more two-phase stationary reference frame feedback stator current samples ($i_\alpha(k)$, $i_\alpha(k+1)$, $i_\alpha(k+2)$, $i_\beta(k)$, $i_\beta(k+1)$, $i_\beta(k+2)$), and a dimensionless gain (K) that is computed based on a sampling time (T) and machine parameters.

* * * * *